(12) United States Patent
Malik

(10) Patent No.: US 7,433,864 B2
(45) Date of Patent: Oct. 7, 2008

(54) COMPILING INFORMATION OBTAINED BY COMBINATORIAL SEARCHING

(75) Inventor: Dale W. Malik, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 419 days.

(21) Appl. No.: 10/820,411

(22) Filed: Apr. 8, 2004

(65) Prior Publication Data

US 2005/0228773 A1 Oct. 13, 2005

(51) Int. Cl.
*G06F 17/30* (2006.01)

(52) U.S. Cl. .................................. 707/3; 707/1

(58) Field of Classification Search ............... 707/1–10, 707/100, 101, 200; 379/114.14
See application file for complete search history.

(56) References Cited

U.S. PATENT DOCUMENTS 6,101,491 A * 8/2000 Woods .......................... 707/3
2004/0153663 A1* 8/2004 Clark et al. .................. 713/200

* cited by examiner

*Primary Examiner*—Don Wong
*Assistant Examiner*—Marc R Filipczyk
(74) *Attorney, Agent, or Firm*—Thomas, Kayden, Horstemeyer & Risley LLP

(57) ABSTRACT

Included are embodiments for searching sensitive information. At least one embodiment of a method includes searching for a first piece of sensitive information, searching for a second piece of sensitive information, and combining a score associated with the search for the first piece of sensitive information and a score associated with the search for the second piece of sensitive information.

17 Claims, 9 Drawing Sheets

---

RESULTS (RAW DATA - COMBINED ITEMS)

| COMBINATIONS | SCORE |
|---|---|
| Combination of Name and: | |
|     Social Security Number | 0 hit(s) |
|     Email Address | 28 hit(s) |
|     Telephone Number | 3 hit(s) |
|     Street Address | 2 hit(s) |
| | |
| Combination of Social Security Number and: | |
|     Email Address | 0 hit(s) |
|     Telephone Number | 0 hit(s) |
|     Street Address | 0 hit(s) |
| | |
| Combination of Email Address and: | |
|     Telephone Number | 1 hit(s) |
|     Street Address | 0 hit(s) |
| | |
| Combination of Telephone Number and: | |
|     Street Address | 1 hit(s) |

RESULTS (RAW DATA - INDIVIDUAL ITEMS)

| CRITERIA | ITEM | SCORE |
|---|---|---|
| Name | Bob Smith | 34 hit(s) |
| Social Security Number | 123-45-6789 | 0 hit(s) |
| Email Address | bsmith@bob.smith.com | 842 hit(s) |
| Telephone Number | (404) 555 - 1234 | 4 hit(s) |
| Street Address | 123 Peachtree Street | 2 hit(s) |

FIG. 6A

RESULTS (RAW DATA - COMBINED ITEMS)

COMBINATIONS | SCORE
---|---
Combination of Name and: |
  Social Security Number | 0 hit(s)
  Email Address | 28 hit(s)
  Telephone Number | 3 hit(s)
  Street Address | 2 hit(s)
Combination of Social Security Number and: |
  Email Address | 0 hit(s)
  Telephone Number | 0 hit(s)
  Street Address | 0 hit(s)
Combination of Email Address and: |
  Telephone Number | 1 hit(s)
  Street Address | 0 hit(s)
Combination of Telephone Number and: |
  Street Address | 1 hit(s)

FIG. 6B

COMPILING INFORMATION OBTAINED BY COMBINATORIAL SEARCHING

FIELD OF THE INVENTION

The present disclosure relates generally to data processing and, more particularly, to searching and compiling information.

BACKGROUND

Due to the ease of publishing material on the Internet (also referred to as the worldwide web or, simply, "the web"), the web has become a virtual storehouse for a variety of information. Of particular concern is personal information that is published on the web, such as, for example, an individual's name, telephone number, email address, social security number, home address, etc. The reason for concern is that the published information poses a risk to the individual by exposing the individual to identity theft, unsolicited email (also referred to as "spam"), invasion of privacy, or other security concerns.

Given the plethora of information available on the web, it would be useful to be able to gather and effectively compile personal information in order to assess an individual's vulnerability to the above-identified, and other, security concerns.

SUMMARY

Included are embodiments for searching sensitive information. At least one embodiment of a method includes searching for a first piece of sensitive information, searching for a second piece of sensitive information, and combining a score associated with the search for the first piece of sensitive information and a score associated with the search for the second piece of sensitive information.

Other systems, devices, methods, features, and advantages will be or become apparent to one with skill in the art upon examination of the following drawings and detailed description. It is intended that all such additional systems, methods, features, and advantages be included within this description, and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 6A is an embodiment of a report showing results obtained from the search.

FIG. 6B is another embodiment of a report showing results obtained from the search.

DETAILED DESCRIPTION OF THE EMBODIMENTS

Figure 1:
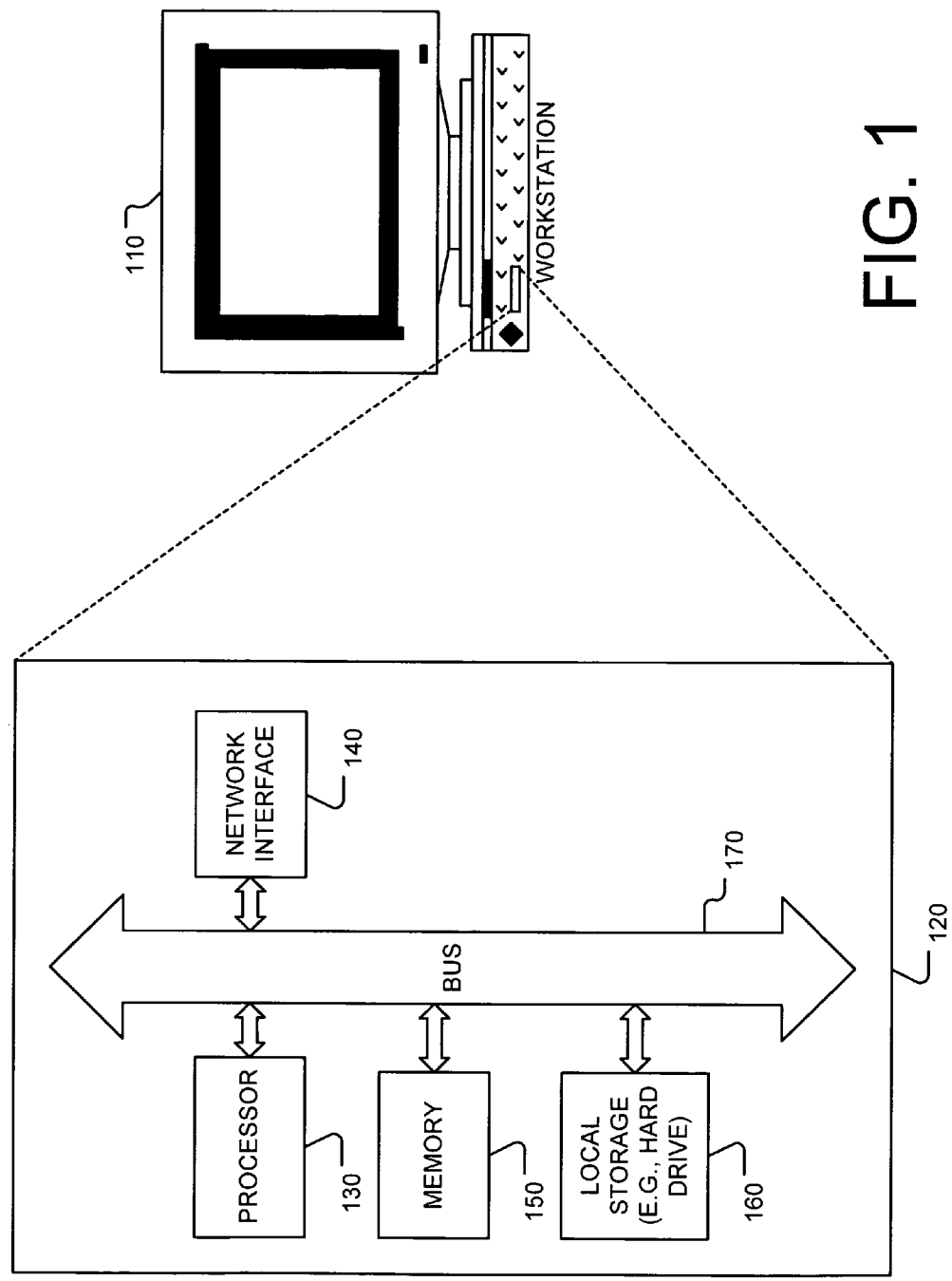
FIG. 1 is a block diagram showing an embodiment of a system for performing a combinatorial search and compiling the results of the search.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

As noted above, it is useful to be able to gather and compile sensitive information in order to assess an individual's vulnerability to various security concerns. One approach, among others, to assessing an individual's vulnerability to various security concerns is to emulate the behavior of a would be spammer or other Internet delinquent. As described in greater detail below, in some embodiments, among others, a spammer's behavior is emulated by searching for sensitive information, and generating a report from the results of the search. For some embodiments, the search is conducted in accordance with various search criteria. In generating the report, the results of the search are assigned various scores or weights, which are then analyzed to determine an individual's vulnerability to various security concerns.

Embodiments of systems and methods are described below with reference to FIGS. 1 through 6C.

FIG. 1 is a block diagram showing an embodiment of a system for performing a combinatorial search and compiling the results of the search. As shown in FIG. 1, in one embodiment, among others, the system is implemented by a personal computer 110 (also referred to herein as a workstation). The workstation 110 includes a processor 130, memory 150, a local storage device 160 (e.g., hard drive, removable floppy drive, compact disc drive, digital versatile disc drive, etc.), and a network interface 140, all communicating over a bus 170. The memory 150 typically includes the operating system (not shown), which is typically stored in non-volatile memory while the computer 110 is turned off, and loaded into volatile memory upon start-up, where it can be executed by the processor 130. In the present embodiment, the computer 110 is configured to communicate over a network, such as the Internet, through an I/O device, such as, for example, an analog modem, DSL modem, ISDN modem, ethernet card, etc., which may be connected to the computer 110 through the network interface 140. Since the general operation of personal computers is known in the art, further discussion of the general operation of the personal computer 110 is omitted here.

Figure 2:
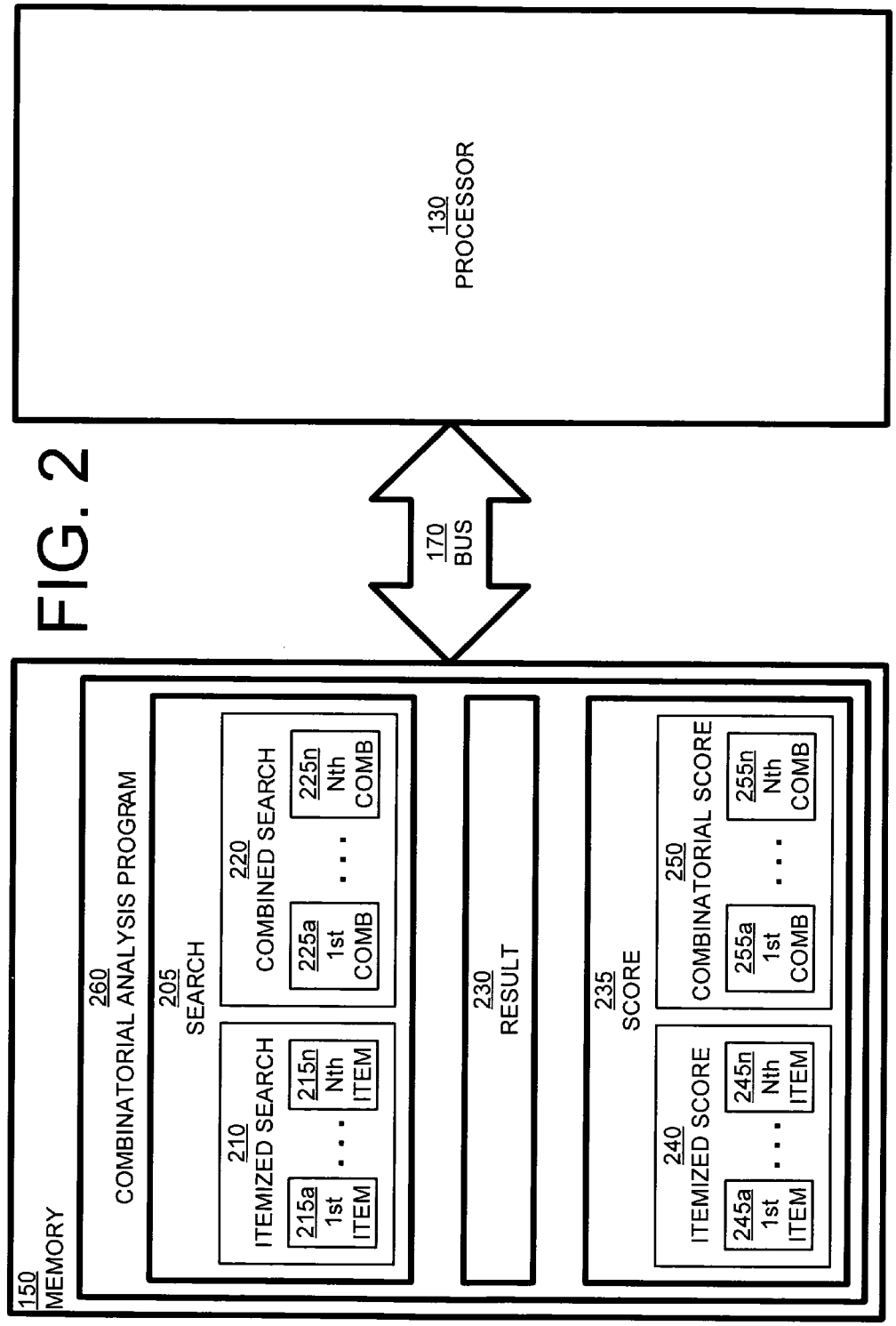
FIG. 2 is a block diagram showing an embodiment of components of the memory of FIG. 1, which are configured to perform the combinatorial search and the information compilation.

FIG. 2 is a block diagram showing an embodiment of components of the memory 150 of FIG. 1. In the embodiment of FIG. 2, those components are configured to search for sensitive information and compile any obtained search results. As shown in FIG. 2, in one embodiment, among others, the memory 150 includes a combinatorial analysis program 260 (also referred to simply as "the program 260"), which searches for sensitive information in accordance with one or more search criteria. In one embodiment, among others, the program 260 searches the contents of Internet web pages using web crawlers that are known in the art. Since various approaches to searching Internet web pages are known in the art, further discussion of web-crawlers, and similar programs, is omitted here. It should also be appreciated that the duration and scope of the search may be specified in accordance with known techniques, such as those employed by various web-crawlers.

Additionally, the program 260 compiles any results that may be obtained from the search. Specifically, for some embodiments, the program 260 searches for sensitive information, such as, for example, a name, an email address, a telephone number, a street address, a social security number, and/or any other sensitive information. As is known, a user may explicitly provide the set of sensitive information. Alternatively, the set of sensitive information may be obtained from a predefined list. In some embodiments, among others, the search is performed on the Internet or other networks, which may exhibit sensitive information. The program 260 is configured to obtain the results of the search and assign scores to the obtained results. In some embodiments, the scores are assigned in accordance with one or more weighting factors or scoring criteria. Upon assigning scores to the obtained results, the program 260 is configured to generate a report.

Once loaded into memory 150, the program 260 manifests itself as logical components within memory 150. These logical components include search logic 205, result logic 230, and score logic 235. Each of the logic components corresponds to a computer-readable code (e.g., a routine or a subroutine) within the program 260. As such, the search logic 205 is configured to search for sensitive information in accordance with predetermined search criteria. The criteria can include, for example, a name of an individual, an email address, a social security number, a telephone number, a street address, or any other personal information associated with an individual. Additionally, the criteria can include one or more combinations of the individual items listed above.

In that regard, the search logic 205 can be further segmented into itemized search logic 210 and combined search logic 220. The itemized search logic 210 includes logic components 215a . . . 215n that are each configured to search for a particular item. For example, the first item search logic 215a can be configured to search for a name, while a second item search logic 215n can be configured to search for an email address, and so on. It should be appreciated that the search logic 205 instructs the processor 130 to search in accordance with predefined criteria. For example, email addresses may be searched by defining a text string to include a single "@" located within a contiguous string of characters. Similarly, social security numbers may be searched by defining a text string to include a nine-digit number with two interposed dashes ("-") after the third digit and the fifth digit, respectively.

The combined search logic 220 includes logic components 225a . . . 225n that are each configured to search for various combinations of items. For example, the first combined search logic 225a can be configured to search for occurrences in which both a name and a social security number appear within the same document (e.g., within a single web page, within a single data file, etc.). Likewise, a second combined search logic 225n can be configured to search for occurrences in which both a social security number and a telephone number appear within the same document. It should be appreciated that a user can define the individual items, or, alternatively, the items can be obtained from a predefined list of items. Similarly, it should be appreciated that the user can define the permutations and combinations for the various combined searches.

In addition to performing a direct string search, it should be appreciated that the search can be modified to include variants of sensitive information. For example, a search for the name "Bob Smith" can include the variants "Robert Smith," "B. Smith," "R. Smith," etc. Likewise, a search for a social security number may appear as a string search for "123-45-6789" or "123456789." Since one having skill in the art should understand how to define the variants of sensitive information, further discussion of such variants, and approaches to defining such variants, is omitted here.

The result logic 230 is configured to obtain the results of the search, while the score logic 235 is configured to assign a score to the obtained results. Since, for some embodiments, the search can result in obtaining individual items as well as combined items, the score logic 235 can be further segmented into itemized score logic 240 and combinatorial score logic 250. The itemized score logic 240 is configured to assign a score to the itemized search results, while the combinatorial search logic 250 is configured to assign a score to the combined search results. Since multiple individual items, as well as multiple combinations, can be searched, the itemized score logic 240 can further be divided into scoring logic 245a . . . 245n for each item. Similarly, since multiple combinatorial searches can be performed, the combinatorial search logic 250 can be further divided into scoring logic 255a . . . 255n for each combination.

Figure 3:
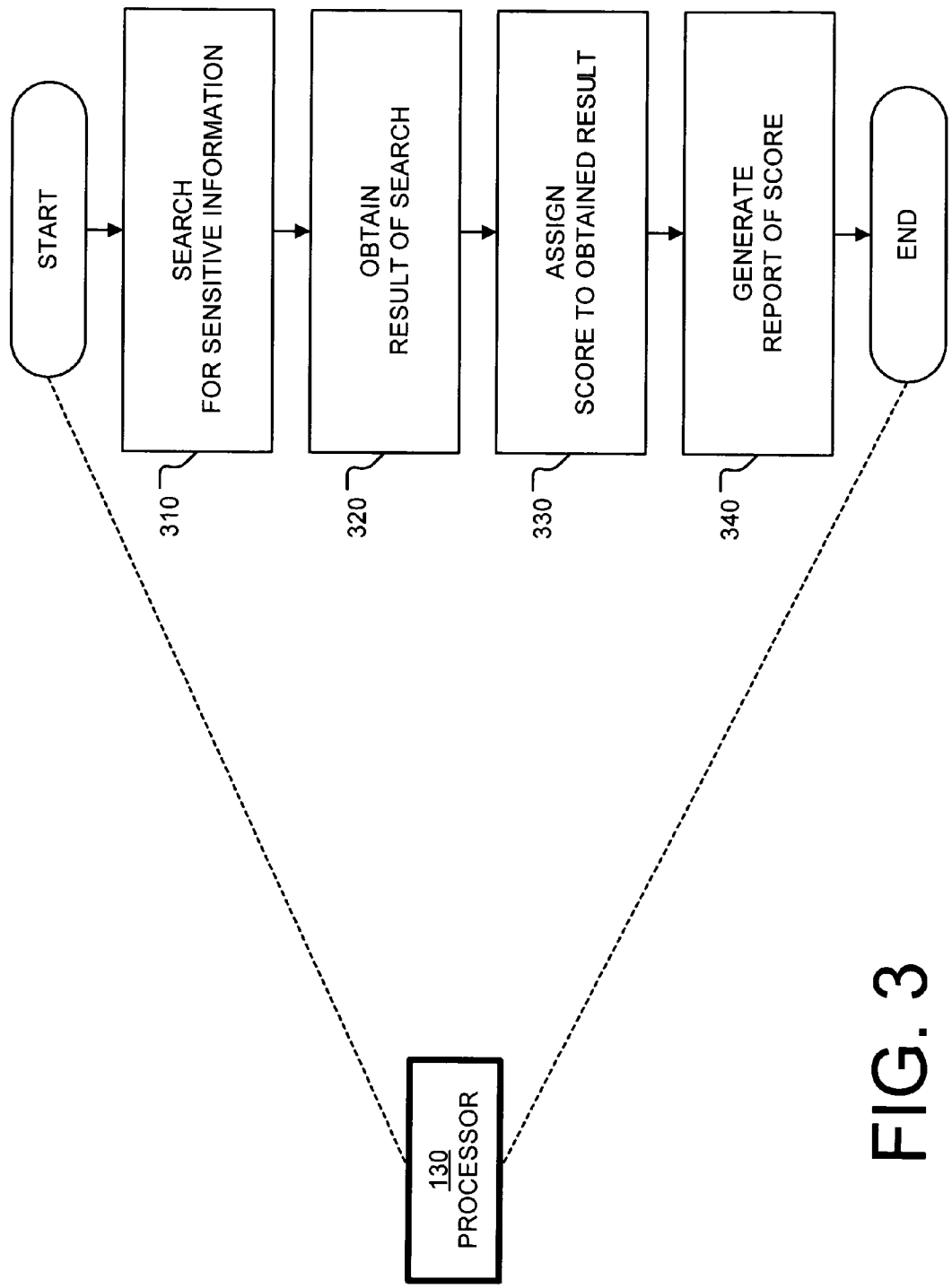
FIG. 3 is a flowchart showing an embodiment of a method for performing a combinatorial search and compiling the results of the search.
Figure 4:
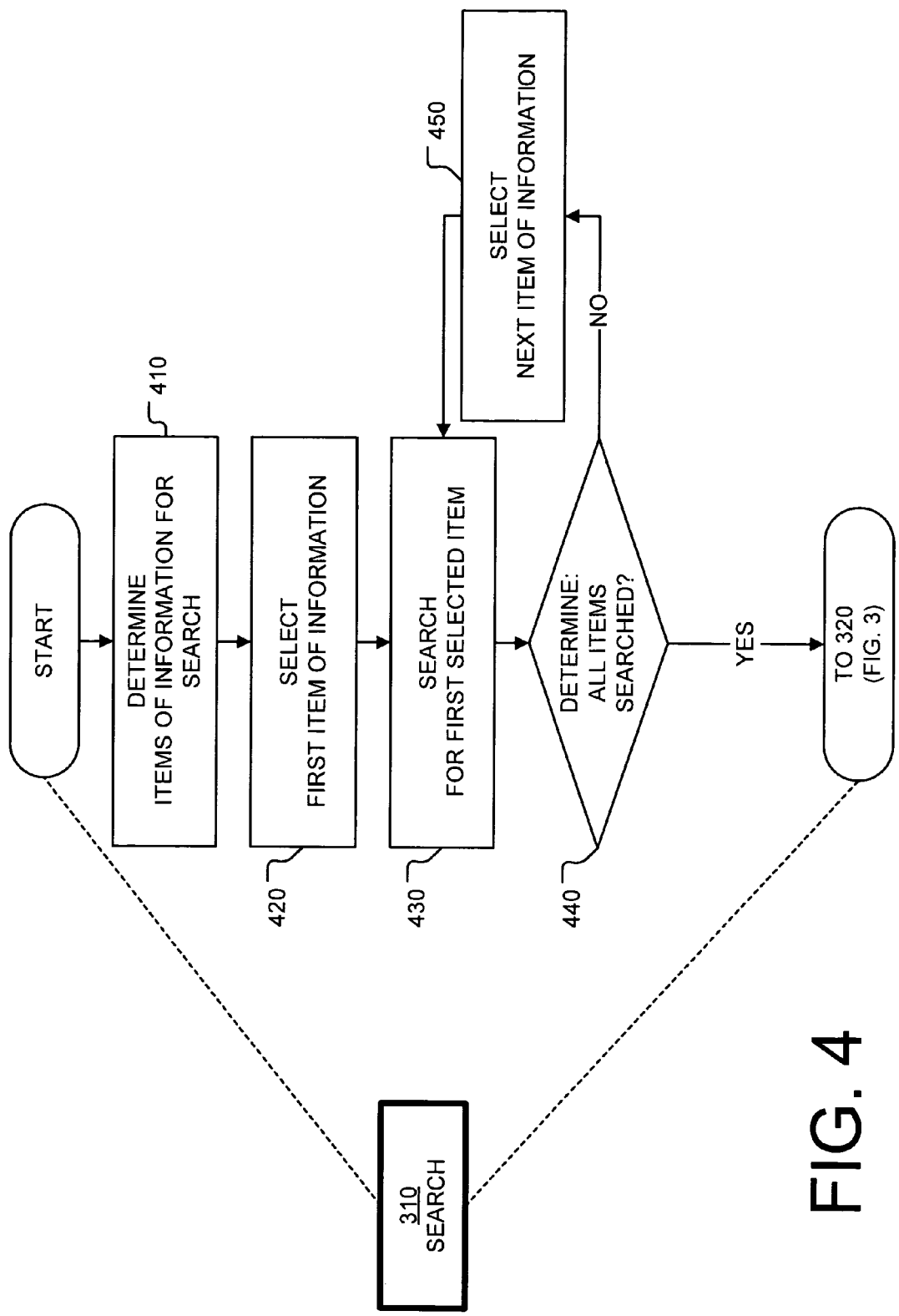
FIG. 4 is a flowchart showing, in greater detail, the step of searching for sensitive information, from FIG. 3.
Figure 5:
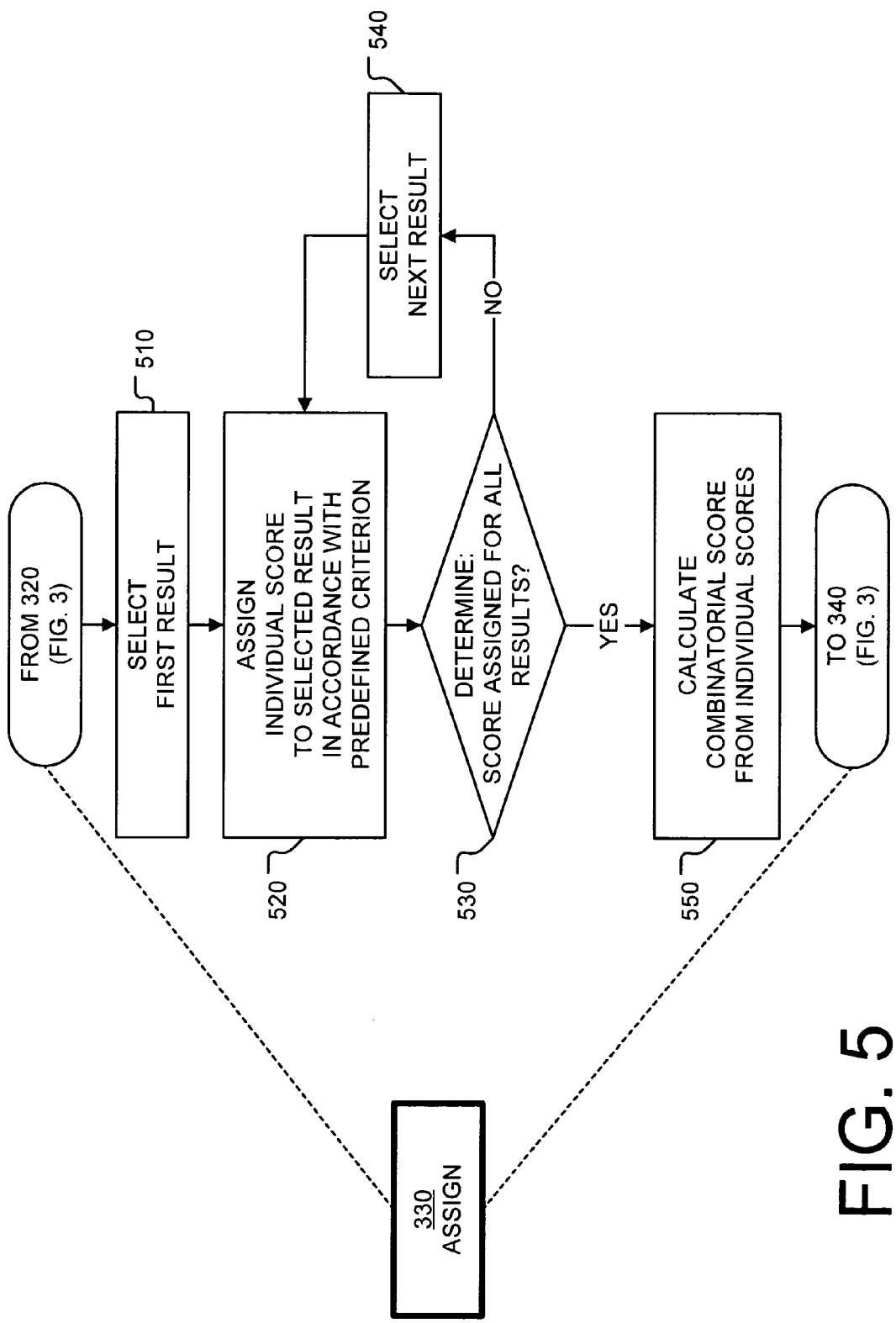
FIG. 5 is a flowchart showing, in greater detail, the step of assigning the score, from FIG. 3.

Having described an embodiment of a system for searching for sensitive information and analyzing the results, attention is turned to FIGS. 3 through 5, which show various embodiments of methods to search for and compile sensitive information.

FIG. 3 is a flowchart showing an embodiment of a method for performing a combinatorial search and compiling the results of the search. As shown in FIG. 3, one embodiment, among others, begins with the step of searching (310) for sensitive information. As noted above, the sensitive information can include personal information associated with an individual, as well as variants of that personal information. Typically, the sensitive information is searched in accordance with defined search criteria. The process continues by obtaining (320) the results of the search, and assigning (330) scores to the obtained results. The scores are assigned in accordance with a predefined weighting factor. Upon assigning (330) scores to the obtained results, the process generates (340) a report of the scores.

The embodiment shown in FIG. 3 largely mimics the behavior of Internet delinquents, who search for sensitive information in order to compile spam lists or other noxious databases. As such, the generated report provides a relatively good representation of an individual's vulnerability to various security concerns.

Figure 7:
FIG. 7 is an embodiment of a graphical user interface (GUI) that permits user entry of information.

FIG. 4 is a flowchart showing, in greater detail, the step of searching (310) for sensitive information, from FIG. 3. As shown in FIG. 4, the step of searching (310) for sensitive information comprises, in some embodiments, the step of determining (410) the items of information for searching. The items of information can include a name, a social security number, an email address, a telephone number, a street address, a credit card number, and/or other sensitive information. The items of information can be determined (410) by obtaining user input, or, alternatively, by obtaining a predefined list from a database. For embodiments that obtain user input, that input can be provided through a graphical user interface (GUI) with various input boxes. For example, when the GUI is provided to the user, the user can input a name, a social security number, an email address, a street address, and/or a variety of other information. One example of a GUI is provided in FIG. 7. The GUI of FIG. 7 provides a mechanism for inputting a telephone number, the last four digits of a social security number, and a zip code. However, it should be appreciated that other fields may be provided for the GUI. Since such GUIs are known in the art, further discussions of these, and other user-input mechanisms, are omitted here. It should also be appreciated that the GUI can implemented as a web page that is remotely accessible, or, alternatively, the GUI can be provided as a local client application. Additionally, it should be appreciated that, should a user input a finite amount of unique information about that user, the system can be configured to access a pre-existing database that has additional information related to that user. Thus, for example, when a user inputs the telephone number and the zip code into the GUI of FIG. 7, that information can be used to retrieve the user's name, address, email, etc.

Upon determining (410) the items of information for searching, the process selects (420) the first item of information, and searches (430) for the selected item. In some embodiments, the search is performed on the Internet. Upon completing the search, the process determines (440) whether or not all items of information have been searched. If there are additional items to be searched, then the process selects (450) the next item of information, and searches (430) for that selected item. This process iteratively repeats itself until all items of information have been searched. It should be appreciated that the selection of an item can also include the selection of a combination of items. Since the modification of the flow of FIG. 4 to accommodate such a combined search is apparent to one having skill in the art, further discussion of such a modification is omitted here.

Using a specific example, given a closed list of items, which includes name, social security number, email address, street address, and a telephone number, a user can assign the following parameters to the items:

| Name: | Bob Smith |
|---|---|
| Social Security Number: | 123-45-6789 |
| Email Address: | bsmith@bob.smith.com |
| Telephone Number: | (404)555-1234 |
| Street Address: | 123 Peachtree Street |

Given these items of information, the process selects "Bob Smith" as the first item of information, and searches the Internet for "Bob Smith." Upon completing the search, the process selects "123-45-6789" for searching, since all items on the list have not yet been exhausted from the list. Once "123-45-6789" has been searched, "bsmith@bob.smith.com" is selected and searched, and so on until the last item, "123 Peachtree Street" has been selected and searched. Thereafter, the process continues to obtaining (320) the results of the search. It should be appreciated that the obtaining (320) of the results and the searching (310) for each item takes place in an alternating fashion. For example, typically, a first search is followed by a first result, a second search is followed by a second result, and so on.

In addition to searching the individual items, the items can be combined for searching. For example, the process may select ("Bob Smith" AND "bsmith@bob.smith.com"), using the Boolean "AND" operation. Likewise, the street address and telephone number can be combined using Boolean operators. As one can appreciate, any number of combinations of items can be searched.

Furthermore, while "Bob Smith" is provided as the "Name," it should be appreciated that variants, such as, for example, "B. Smith," "Robert Smith," "R. Smith," etc. can easily be substituted. For some embodiments, the variants can be substituted manually. For other embodiments, the variants can be obtained from a database that lists common variants. For example, a database that stores common variants can be stored at a server, thereby providing access to the database to any client that is communicatively coupled to the server. As another example, the database may be a local database that stores common variants. For yet other embodiments, a computer program that generates such variants can be utilized to produce the variants. Since programs that determine various permutations of names are known in the art, further discussion of such programs is omitted here.

FIG. 5 is a flowchart showing, in greater detail, the step of assigning (330) the score, from FIG. 3. As shown in FIG. 5, once the results of the search have been obtained (320), the process selects (510) the first result, and assigns (520) an individual score to the selected result in accordance with a predefined criterion. Thereafter, the process determines (530) whether or not scores have been assigned to all of the results. If the score has not been assigned to all of the results, then the next result is selected (540) and the process repeats until all of the items have been assigned a score. Once all of the items have been assigned a score, the process calculates (550) a combinatorial score as a function of each of the individual scores.

Figure 6C:
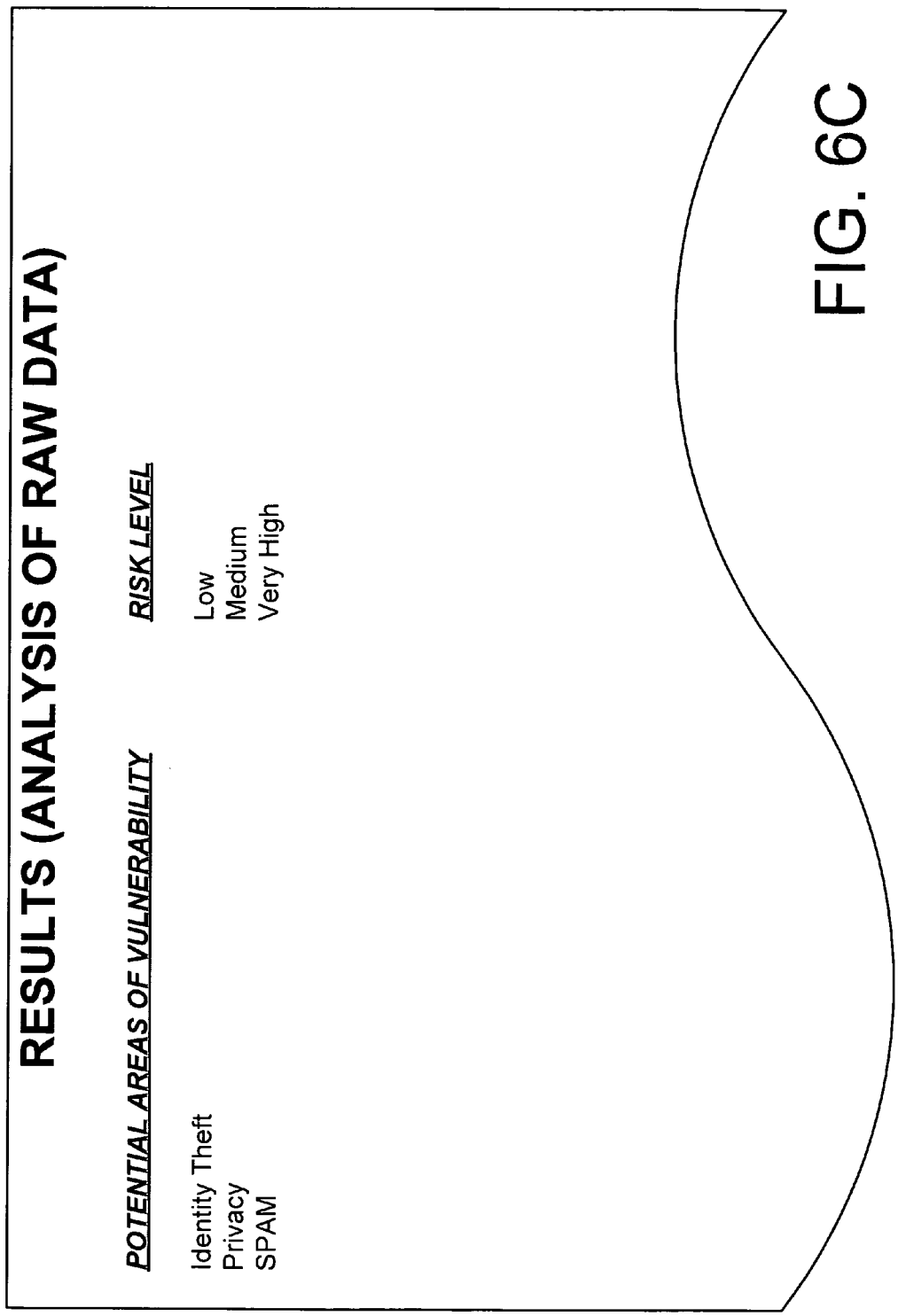
FIG. 6C is an embodiment of a report showing compiled results.

In some embodiments, the score can be a direct reflection of the number of occurrences of the item. For example, as shown in FIGS. 6A through 6C, if a search for "Bob Smith" resulted in 34 occurrences, then the score for "Bob Smith" would be 34. While such a direct approach is implemented in a preferred embodiment, it should be appreciated that a score can be assigned based on a variety of factors. For example, in the context of the Internet, the presence of an email address on the Internet may be a commonplace occurrence, while the presence of a social security number may be a rarer occurrence. Thus, a single occurrence of a social security number may be assigned a greater significance than, say, five occurrences of an email address.

Similarly, a web site that has both name and the social security number may be assigned a greater weight or score, since that combinatorial occurrence poses a greater vulnerability for an individual. It should also be appreciated that, in addition to combinations, the proximity of the occurrences may provide different scores or weights. For example, a name that is located within five characters of a telephone number may be given a greater weight than a name that is located more than 5,000 characters from a telephone number, since a closer proximity suggests that the two are likely correlated.

In a preferred embodiment, the following combinations can be given a heightened score due to their corresponding risks:

An email address alone poses a risk of spam. With each occurrence of the email address, the risk of spam increases.

A name in conjunction with a social security number poses a high risk of identity theft. That risk increases when the name and the social security number are located in close proximity (e.g., within five characters) of each other.

A name and a street address, or a name and a telephone number, in combination poses a privacy risk, insofar as an individual's contact information is readily available.

In addition to the above-defined risks, a "linking" site may further heighten the score due to heightened security concerns. In other words, a search may produce two distinct web sites, each of which are benign, in and of themselves. However, the combination of results may produce a heightened risk. For example, a search may result in two web sites: one that shows a combination of a name and an email address; and another that shows a combination of the email address and a social security number. Each of the web sites is relatively benign. However, since the two sites, combined, provide a link between the name and the social security number, the combination of the results may be given a heightened score due to the increased risk of identity theft.

As one can appreciate, the scoring of the results can be implemented in a variety of ways, depending on the security risks that are sought to be uncovered. Since those having skill in the art should appreciate the various approaches to assigning weights or scores to the obtained results, further discussion of the various approaches is omitted here.

FIGS. 6A through 6C shown an embodiment of a report showing results obtained from the search. Specifically, FIGS. 6A through 6C show the results of the example illustrated above. As shown in FIG. 6A, the results can include the various scores for the individual items, such as, name, social security number, email address, telephone number, and street address. Since the illustrated example uses "Bob Smith" for the name, "123-45-6789" for the social security number, "bsmith@bob.smith.com" for the email address, "(404) 555-1234" for the telephone number, and "123 Peachtree Street" for the street address, the individual items of FIG. 6A reflect those specifically searched items. In that example, the search uncovered 34 occurrences of the name, 0 occurrences of the social security number, 842 occurrences of the email address, 4 occurrences of the telephone number, and 2 occurrences of the street address.

FIG. 6B shows scores that have been assigned to combined items. For example, the results of FIG. 6B show that, of the 34 occurrences of the name, 28 occurrences coincided with an email address. In other words, in the context of the Internet, there were 28 web sites that included both the name and the email address. Since the remaining combinations are self-evident in FIG. 6B, the reader is directed to FIG. 6B without further discussion of the combined items.

Given the results of FIGS. 6A and 6B, a final analysis of the results is shown in FIG. 6C. For this embodiment, only three areas of vulnerability are shown: identity theft, privacy, and spam. However, it should be appreciated that, for other embodiments, additional areas of vulnerability may be added as a function of the individually searched and obtained items. For FIG. 6C, since no occurrences resulted from the search of the social security number, the risk of identity theft is relatively low. Also, since the name appears in combination with the telephone number as well as the street address, there is a privacy risk. However, due to the relatively low number of occurrences, there is only a moderate risk to the privacy concerns of "Bob Smith." Due to the enormous number of occurrences for the email address (832 total occurrences), the report shows that "Bob Smith" has a very high risk of receiving spam.

As shown in the embodiments of FIGS. 1 through 6C, by performing a search for sensitive information and generating a report of the obtained results, an individual can assess the level of vulnerability in various areas. Once the level of vulnerability has been assessed, the individual can take appropriate action to ameliorate the risks.

The search logic 205, the result logic 230, the score logic 235, the itemized search logic 210, the combined search logic 220, the itemized score logic 240, the combinatorial search logic 250, and their various logic components 215a . . . 215n (or simply 215), 225a . . . 225n (or simply 225), 245a . . . 245n (or simply 245), and 255a . . . 255n (or simply 255) may be implemented in hardware, software, firmware, or a combination thereof. In the preferred embodiment(s), the search logic 205, the result logic 230, the score logic 235, the itemized search logic 210, the combined search logic 220, the itemized score logic 240, the combinatorial search logic 250, and their various logic components 215, 225, 245, and 255 are implemented in software or firmware that is stored in a memory and that is executed by a suitable instruction execution system. If implemented in hardware, as in an alternative embodiment, the search logic 205, the result logic 230, the score logic 235, the itemized search logic 210, the combined search logic 220, the itemized score logic 240, the combinatorial search logic 250, and their various logic components 215, 225, 245, and 255 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The combinatorial analysis program 260 program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while a personal computer 110 is shown as an example embodiment of a system, it should be appreciated that the system can be implemented using other programmable devices, such as, for example, a personal digital assistant (PDA), an Internet-capable cellular telephone, etc.

It should also be appreciated that, while various server-based systems, client-based systems, and computer-readable media are disclosed, the program and logic components that execute the various functions of the program can be located either server-side or client-side. Also, it should be appreciated that the various components can be located within a distributed networking environment. Since distributed networks, as well as client-server environments, are known in the art further discussions of distributed networks and client-server environments is omitted here.

Additionally, it should be appreciated that the disclosed systems and methods can be provided as a service to various subscribers. Thus, for those embodiments, a user can purchase combinatorial-search services, as disclosed above, from a service provider. That service provider will subsequently provide the results of the combinatorial search for a fee. For some embodiments, the services can be subscribed to over a web interface. For other embodiments, the services can also be subscribed to over the telephone, where the relevant information is provided over the telephone.

For some embodiments, rather than purchasing services for combinatorial searches, a user can purchase a software product that performs the combinatorial search. In that regard, the software can be purchased as a computer-readable medium, as described above, or downloaded from a web-site in accordance with known techniques. In still other embodiments, the combinatorial search may be packaged as a combination of a product and a service. For example, a user can purchase software that provides access to services from a combinatorial-search service provider.

All such changes, modifications, and alterations should therefore be seen as within the scope of the disclosure.

What is claimed is:

1. A computer-readable medium having stored in memory computer executable instructions that when executed by a computer are configured to perform the following:
    search for a first piece of sensitive information, the first piece of sensitive information including personal information regarding at least one user;
    search for a second piece of sensitive information, the second piece of sensitive information including personal information regarding the at least one user;
    obtain a result of the search for the first piece of sensitive information, the first piece of sensitive information being of a first type;
    obtain a result of the search for the second piece of sensitive information, the second piece of sensitive information being of a second type, the first type of information being different than the second type of information;
    assign a first score, the first score being determined from the number of occurrences of the first piece of sensitive data, as revealed in the search for the first piece of sensitive data;
    assign a second score, the second score being determined from the number of occurrences of the second piece of sensitive data, as revealed in the search for the second piece of sensitive data;
    combine the first score and the second score;
    provide the combined score to a user; and
    automatically determine, from the combined, score and a combination of sensitive information types searched, a risk for at least one identity-related vulnerability,
    wherein sensitive information includes at least one of the following: a name, an address, a social security number, a telephone number, and an email address.

2. The computer-readable medium of claim 1, wherein determining the risk for at least one identity-related vulnerability includes determining a likelihood for identity theft and classifying the likelihood as a level of risk.

3. The computer-readable medium of claim 1, wherein determining the likelihood for at least one identity-related vulnerability includes determining a magnitude of risk for a privacy breach.

4. The computer-readable medium of claim 1, wherein determining the risk for at least one identity-related vulnerability includes determining a likelihood of receiving spam and classifying the likelihood as a level of risk.

5. The computer-readable medium of claim 1, wherein the search for the first piece of sensitive information includes a search of one or more web pages.

6. The computer-readable medium of claim 1, wherein the search for the second piece of sensitive information includes a search of one or more web pages.

7. A computer method comprising:
    searching for a first piece of sensitive information, the first piece of sensitive information including personal information regarding at least one user;
    searching for a second piece of sensitive information, the second piece of sensitive information including personal information regarding the at least one user;
    obtaining a result of the search for the first piece of sensitive information, the first piece of sensitive information being of a first type;
    obtaining a result of the search for the second piece of sensitive information, the second piece of sensitive information being of a second type, the first type of information being different than the second type of information;
    assigning a first score, the first score being determined from the number of occurrences of the first piece of sensitive data, as revealed in the search for the first piece of sensitive data;
    assigning a second score, the second score being determined from the number of occurrences of the second piece of sensitive data, as revealed in the search for the second piece of sensitive data;
    combining, by an electronic device, the first score and the second score;
    providing, by the electronic device, the combined score to a user; and
    automatically determining, from the combined score and a combination of sensitive information types searched, a risk for at least one identity-related vulnerability,
    wherein sensitive information includes at least one of the following: a name, an address, a social security number, a telephone number, and an email address.

8. The method of claim 7, wherein determining the risk for at least one identity-related vulnerability includes determining a likelihood of identity theft and classifying the likelihood as a level of risk.

9. The method of claim 7, wherein determining the risk for at least one identity-related vulnerability includes determining a likelihood of a privacy breach and classifying the likelihood as a level of risk.

10. The method of claim 7, wherein determining the risk for at least one identity-related vulnerability includes determining a magnitude of risk for receiving spam.

11. The method of claim 7, wherein searching for the first piece of sensitive information includes searching one or more web pages, and wherein searching for the second piece of sensitive information includes searching one or more web pages.

12. The method of claim 7, wherein the electronic device includes a personal computer.

13. A system comprising:

a processor; and a memory that stores:

a first searching component configured to search for a first piece of sensitive information, the first piece of sensitive information including personal information regarding at least one user;

a second searching component configured to search for a second piece of sensitive information, the second piece of sensitive information including personal information regarding the at least one user;

a first obtaining component configured to obtain a result of the search for the first piece of sensitive information, the first piece of sensitive information being of a first type;

a second obtaining component configured to obtain a result of the search for the second piece of sensitive information, the second piece of sensitive information being of a second type, the first type of information being different than the second type of information;

a first assigning component configured to assign a first score, the first score being determined from the number of occurrences of the first piece of sensitive data, as revealed in the search for the first piece of sensitive data;

a second assigning component configured to assign a score, the second score being determined from the number of occurrences of the second piece of sensitive data, as revealed in the search for the second piece of sensitive data;

a combining component configured to combine the first score and the second score;

a providing component configured to provide the combined score to a user; and a determining component configured to automatically determine, from the combined score and a combination of sensitive information types searched, a risk for at least one identity-related vulnerability, wherein sensitive information includes at least one of the following: a name, an address, a social security number, a telephone number, and an email address.

14. The system of claim 13, wherein determining the risk for at least one identity-related vulnerability includes determining a likelihood of identity theft and classifying the likelihood as a level of risk.

15. The system of claim 13, wherein determining the risk for at least one identity-related vulnerability includes determining a likelihood of a privacy breach and classifying the likelihood as a level of risk.

16. The system of claim 13, wherein determining the risk for at least one identity-related vulnerability includes determining a likelihood of receiving spam and classifying the likelihood as a level of risk.

17. The system of claim 13, wherein searching for sensitive information includes searching one or more web pages.

* * * * *